United States Patent
United States Patent
Lee et al.

(10) Patent No.: US 9,783,177 B2
(45) Date of Patent: Oct. 10, 2017

(54) BRAKING SYSTEM HAVING ELECTROMECHANICAL BRAKING FUNCTION AND METHOD FOR CONTROLLING THE SAME

(71) Applicants: Hyundai Motor Company, Seoul (KR); Hyundai Mobis Co., Ltd., Seoul (KR)

(72) Inventors: Jounghee Lee, Suwon-si (KR); Jae Hun Shim, Hwaseong-si (KR); Sang Hyun Shim, Seoul (KR); Gab Bae Jeon, Hwaseong-si (KR); Jongsung Kim, Seoul (KR)

(73) Assignees: Hyundai Motor Company, Seoul (KR); Hyundai Mobis Co., Ltd., Seoul (KR)

( * ) Notice: Subject to any disclaimer, the term of this patent is extended or adjusted under 35 U.S.C. 154(b) by 0 days.

(21) Appl. No.: 14/959,143

(22) Filed: Dec. 4, 2015

(65) Prior Publication Data

US 2016/0325724 A1    Nov. 10, 2016

(30) Foreign Application Priority Data

May 7, 2015  (KR) ......................... 10-2015-0063762

(51) Int. Cl.
*B60T 13/66* (2006.01)
*B60T 13/68* (2006.01)
(Continued)

(52) U.S. Cl.
CPC .............. *B60T 13/662* (2013.01); *B60T 8/32* (2013.01); *B60T 13/166* (2013.01);
(Continued)

(58) Field of Classification Search
CPC .... B60T 13/662; B60T 13/166; B60T 13/586; B60T 13/686; B60T 13/741; B60T 7/042; F16D 65/183
(Continued)

(56) References Cited

U.S. PATENT DOCUMENTS 8,622,179 B2 * 1/2014 Watanabe ............... B60T 7/042
188/1.11 E
2006/0267402 A1 * 11/2006 Leiter ..................... B60T 7/107
303/20

(Continued)

FOREIGN PATENT DOCUMENTS

| JP | 2014-61892 A | 4/2014 |
| KR | 10-2008-0088059 A | 10/2008 |
| KR | 10-2011-0026588 A | 3/2011 |

*Primary Examiner* — Melanie Torres Williams
(74) *Attorney, Agent, or Firm* — Morgan, Lewis & Bockius LLP (57) ABSTRACT

A braking system having an electromechanical braking function may include a compound caliper device including a motor and configured to press a pair of brake pads against a brake disk, a hydraulic pressure producer including a master hydraulic line receiving oil from a master cylinder, a master valve configured to open and close the master hydraulic line, a caliper hydraulic line connected to the compound caliper device, and a hydraulic pump configured to increase hydraulic pressure supplied to the compound caliper device, and a brake controller to control the motor and the hydraulic pressure producer, in which the brake controller is configured to close the master valve and decrease clamping force of the brake pads applied by the motor when a conversion condition for converting a parking brake stage into a primary brake stage is satisfied.

9 Claims, 12 Drawing Sheets

(51) Int. Cl.
*B60T 13/74* (2006.01)
*B60T 13/16* (2006.01)
*B60T 13/58* (2006.01)
*F16D 65/18* (2006.01)
*B60T 8/32* (2006.01)
*F16D 121/04* (2012.01)
*F16D 121/14* (2012.01)
*B60T 8/34* (2006.01)

(52) U.S. Cl.
CPC .......... *B60T 13/586* (2013.01); *B60T 13/686* (2013.01); *B60T 13/741* (2013.01); *F16D 65/183* (2013.01); *B60T 8/348* (2013.01); *F16D 2121/04* (2013.01); *F16D 2121/14* (2013.01)

(58) Field of Classification Search
USPC .................... 303/20, 192, 16, 89; 188/106 P
See application file for complete search history.

(56) References Cited

U.S. PATENT DOCUMENTS

2008/0185235 A1\* 8/2008 Suzuki .................... B60T 7/042
188/1.11 E
2014/0144731 A1\* 5/2014 Knechtges .............. B60T 7/042
188/72.3

\* cited by examiner

BRAKING SYSTEM HAVING ELECTROMECHANICAL BRAKING FUNCTION AND METHOD FOR CONTROLLING THE SAME

CROSS-REFERENCE TO RELATED APPLICATION

The present application claims priority to Korean Patent Application No. 10-2015-0063762 filed May 7, 2015, the entire contents of which is incorporated herein for all purposes by this reference.

BACKGROUND OF THE INVENTION

Field of the Invention

The present invention relates to a braking system having an electromechanical braking function and a method for controlling the same. More particularly, the present invention relates to a braking system having an electromechanical braking function that can perform a parking braking electronically and a primary braking electromechanically.

Description of Related Art

In general, force applied to a parking cable by pulling a parking brake lever is uniformly distributed to a brake mechanism mounted in a wheel through an equalizer, and thus the brake mechanism restricts the wheel to prevent a vehicle from moving.

When braking a wheel by manipulating the parking brake lever, a driver should manually operate the parking brake lever for parking braking. However, it is inconvenient to perform a manual operation at this time, and the driver often forgets to carry out the manual operation. There accordingly is danger of an accident In order to address the inconvenience of such a manual method, an electrical parking brake (EPB) is implemented that enables a parking brake stage to be safely maintained when simply performing a parking operation by using driving torque of a motor.

When a driver pushes a parking button to operate the motor, the EPB may perform the parking operation by using the driving torque of the motor.

Conventionally, a brake for performing the parking braking is separately provided from a brake for performing primary braking (braking depending on a manipulation of a brake pedal by a driver), thereby increasing cost and weight.

In relation to the above, a compound caliper device using hydraulic pressure and electric motion element has been developed. A braking system including the compound caliper device performs the parking braking by using the electric motion element. When the parking braking is released, the primary braking is performed by using the hydraulic pressure and the electric motion element.

However, in the conventional braking system including the compound caliper device, valves for supplying the hydraulic pressure are operated several times while the parking brake stage is converted into the primary brake stage. As a result, overshoot of total braking force occurs, and a time required for converting the parking brake stage into the primary brake stage is increased.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing a braking system having an electromechanical braking function and a method for controlling the same having advantages of preventing overshoot of total braking force and decreasing a transition period during which a parking brake stage is converted into a primary brake stage.

According to various aspects of the present invention, a braking system having an electromechanical braking function may include a compound caliper device including a motor and configured to press a pair of brake pads against a brake disk, a hydraulic pressure producer including a master hydraulic line receiving oil from a master cylinder, a master valve configured to open and close the master hydraulic line, a caliper hydraulic line connected to the compound caliper device, and a hydraulic pump configured to increase hydraulic pressure supplied to the compound caliper device, and a brake controller to control the motor and the hydraulic pressure producer, in which the brake controller may be configured to close the master valve and decrease clamping force of the brake pads applied by the motor when a conversion condition for converting a parking brake stage into a primary brake stage is satisfied.

The compound caliper device may include a housing body having an inflow/outflow passage connected to the hydraulic pressure producer, an external piston disposed in the housing body to be reciprocated by the motor or the hydraulic pressure producer, an internal piston disposed to be reciprocated with respect to the external piston, and a spindle coupled to the internal piston and operated by the motor.

The braking controller may be configured to determine whether the internal piston is separated from the external piston while decreasing the clamping force of the brake pads applied by the motor, and when the internal piston is separated from the external piston, the controller may be configured to control the hydraulic pump to generate hydraulic pressure considering i) the decreased clamping force of the brake pads applied by the motor and ii) total braking force in the primary brake stage.

The internal piston may be separated from the external piston, the brake controller may be configured to decrease the clamping force of the brake pads applied by the motor and may be configured to increase hydraulic pressure supplied from the hydraulic pump to the compound caliper device until the internal piston is separated by a predetermined gap from the external piston.

In the parking brake stage, the internal piston may be configured to contact the external piston by the motor without providing hydraulic pressure of the hydraulic pressure producer.

The hydraulic pressure producer may further include a pump hydraulic line connecting the hydraulic pump to the caliper hydraulic line, and an accumulator in which oil discharged from the compound caliper device is stored.

The braking system may further include a hydraulic caliper device operated by the hydraulic pressure producer, in which the compound caliper device may be disposed at at least one of a front wheel and a rear wheel, and the hydraulic caliper device may be disposed a remaining one of the front wheel and the rear wheel.

In the primary brake stage, the brake controller may be configured to control the motor to increase or decrease hydraulic pressure in a first hydraulic chamber of the compound caliper device and a second hydraulic chamber of the hydraulic caliper device.

A plurality of gears for boosting rotational force of the motor may be disposed between the spindle and the motor.

According to various aspects of the present invention, a method for controlling a braking system may include closing a master valve and decreasing clamping force of brake pads applied by a motor when a conversion condition for converting a parking brake stage into a primary brake stage is satisfied, and controlling a hydraulic pump to generate hydraulic pressure considering the decreased clamping force of the brake pads applied by the motor and total braking force in the primary brake stage when an internal piston is separated from an external piston, in which the braking system may include a compound caliper device including a motor, an external piston, an internal piston, and a spindle, and pressing a pair of the brake pads to a brake disk, and a hydraulic pressure producer including a master hydraulic line that receives oil from a master cylinder, the master valve that opens and closes the master hydraulic line, a caliper hydraulic line connected to the compound caliper device, and the hydraulic pump that increases hydraulic pressure supplied to the compound caliper device.

The method may further include decreasing the clamping force of the brake pads applied by the motor and increasing hydraulic pressure supplied from the hydraulic pump to the compound caliper device until the internal piston is separated by a predetermined gap from the external piston.

It is understood that the term "vehicle" or "vehicular" or other similar terms as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuel derived from resources other than petroleum). As referred to herein, a hybrid vehicle is a vehicle that has two or more sources of power, for example, both gasoline-powered and electric-powered vehicles.

The methods and apparatuses of the present invention have other features and advantages which will be apparent from or are set forth in more detail in the accompanying drawings, which are incorporated herein, and the following Detailed Description, which together serve to explain certain principles of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Figure 1:
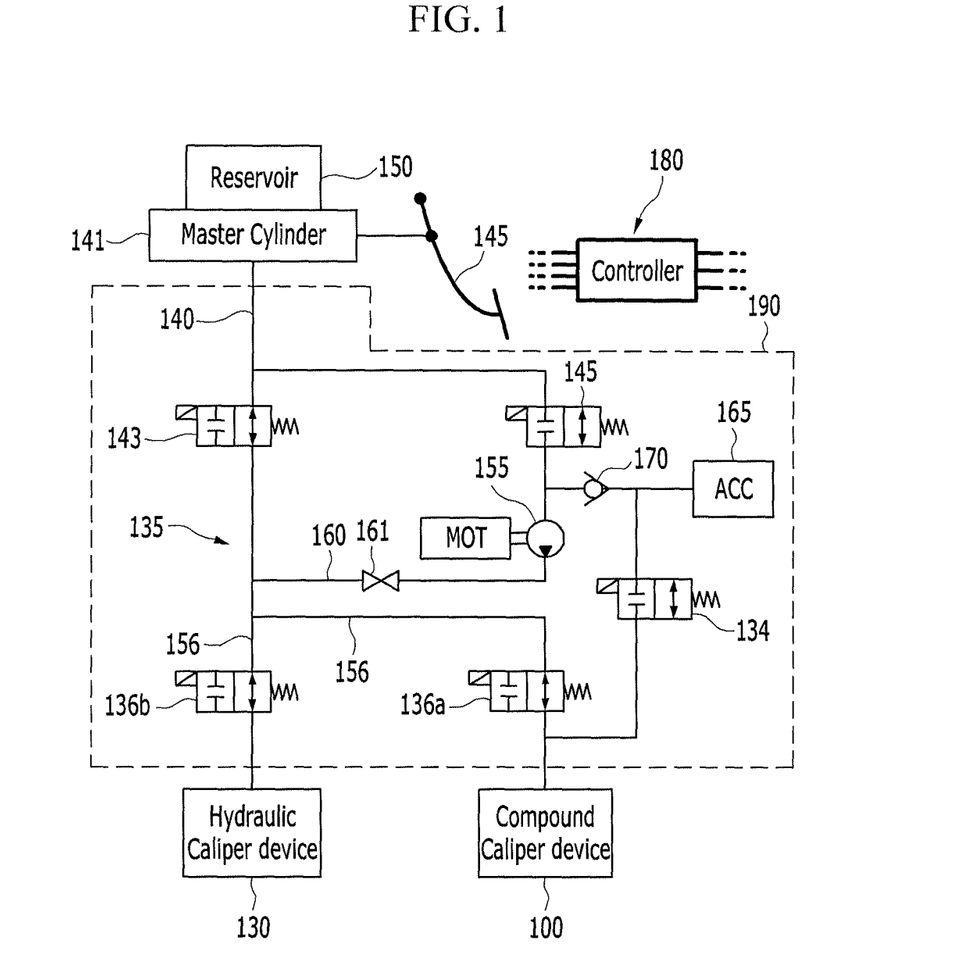
FIG. 1 is a schematic diagram of an exemplary braking system in a parking brake stage according to an exemplary embodiment of the present invention.
Figure 2:
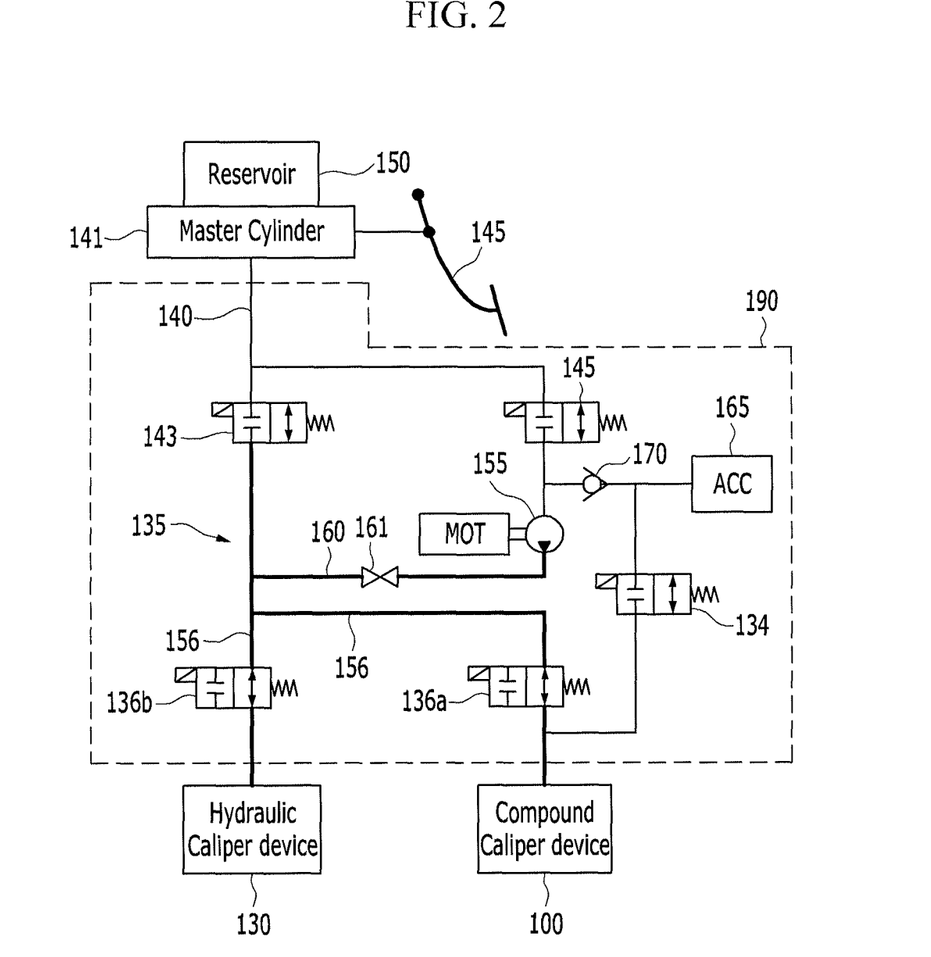
FIG. 2 is a schematic diagram of the exemplary braking system in a state in which a master valve is closed according to the present invention.
Figure 3:
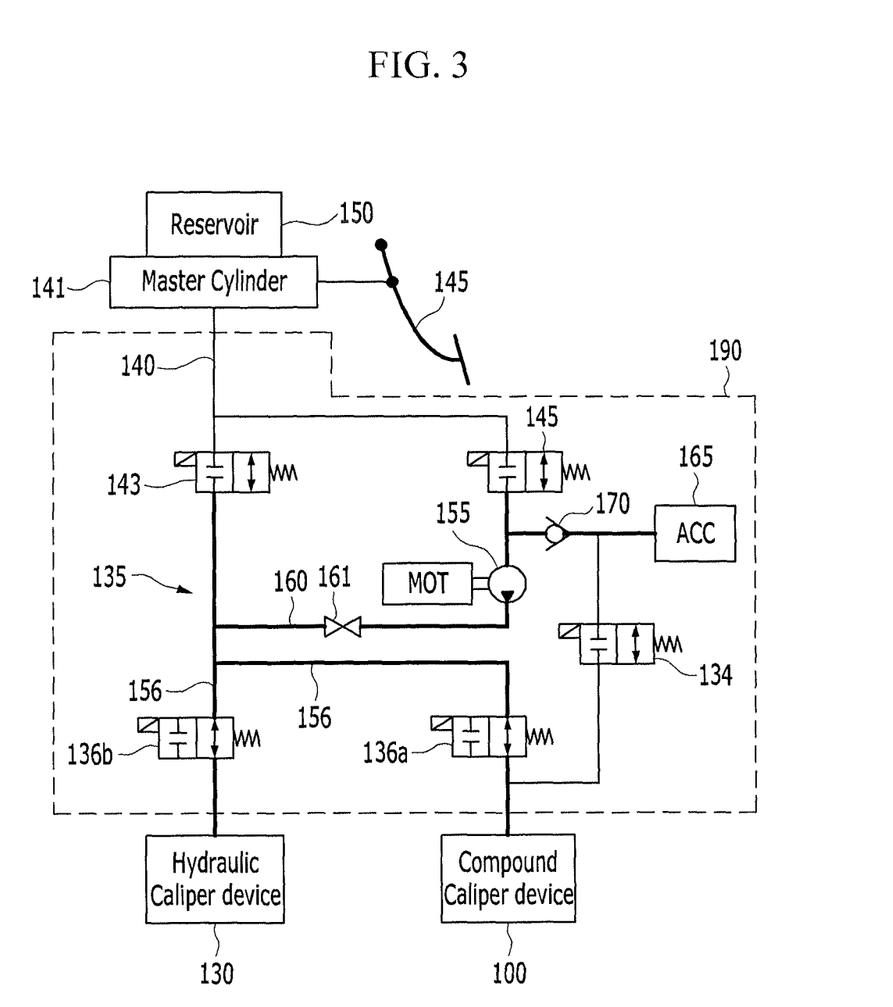
FIG. 3 is a schematic diagram of the exemplary braking system in a state in which a hydraulic pump is operated according to the present invention.
Figure 4:
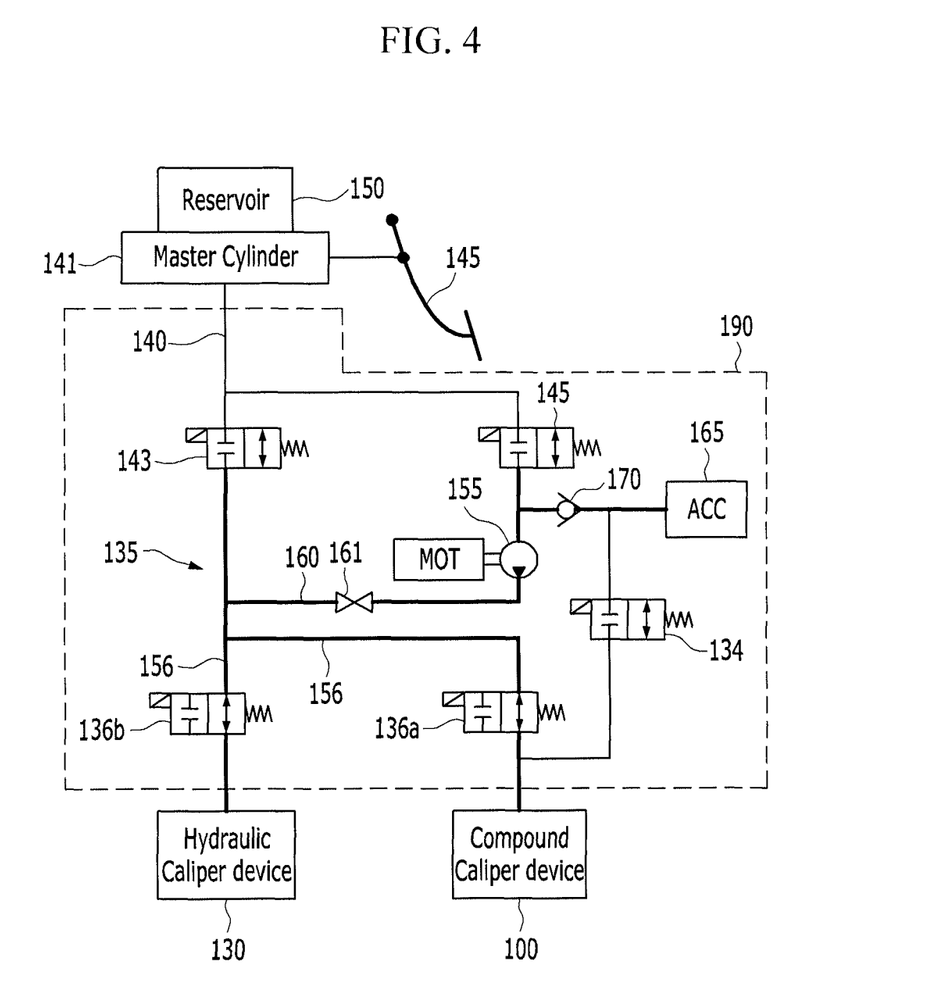
FIG. 4 is a schematic diagram of the exemplary braking system in a primary brake stage according to the present invention.
Figure 5:
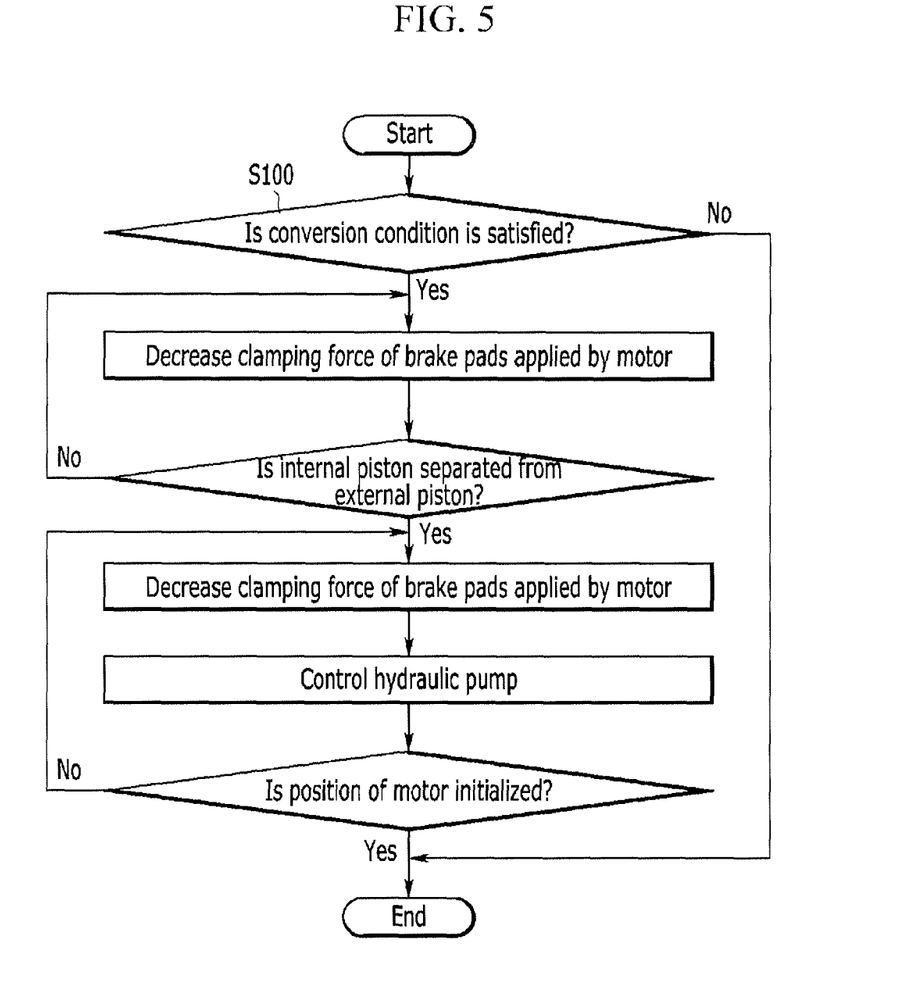
FIG. 5 is a flowchart of an exemplary method for controlling a braking system according to the present invention.
Figure 6:
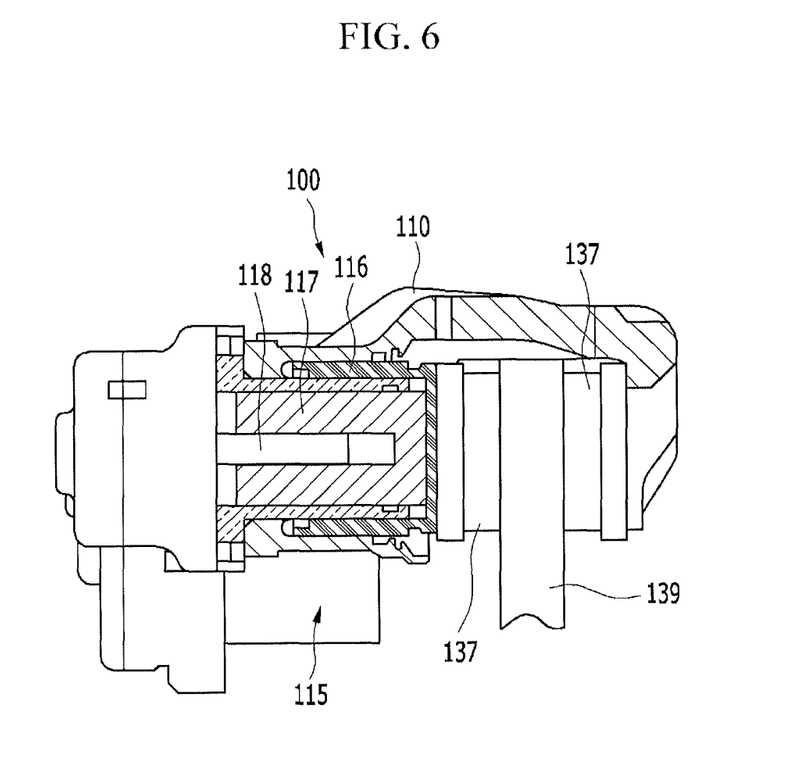
FIG. 6 is a cross-sectional view of a compound caliper device according to the present invention.
Figure 7:
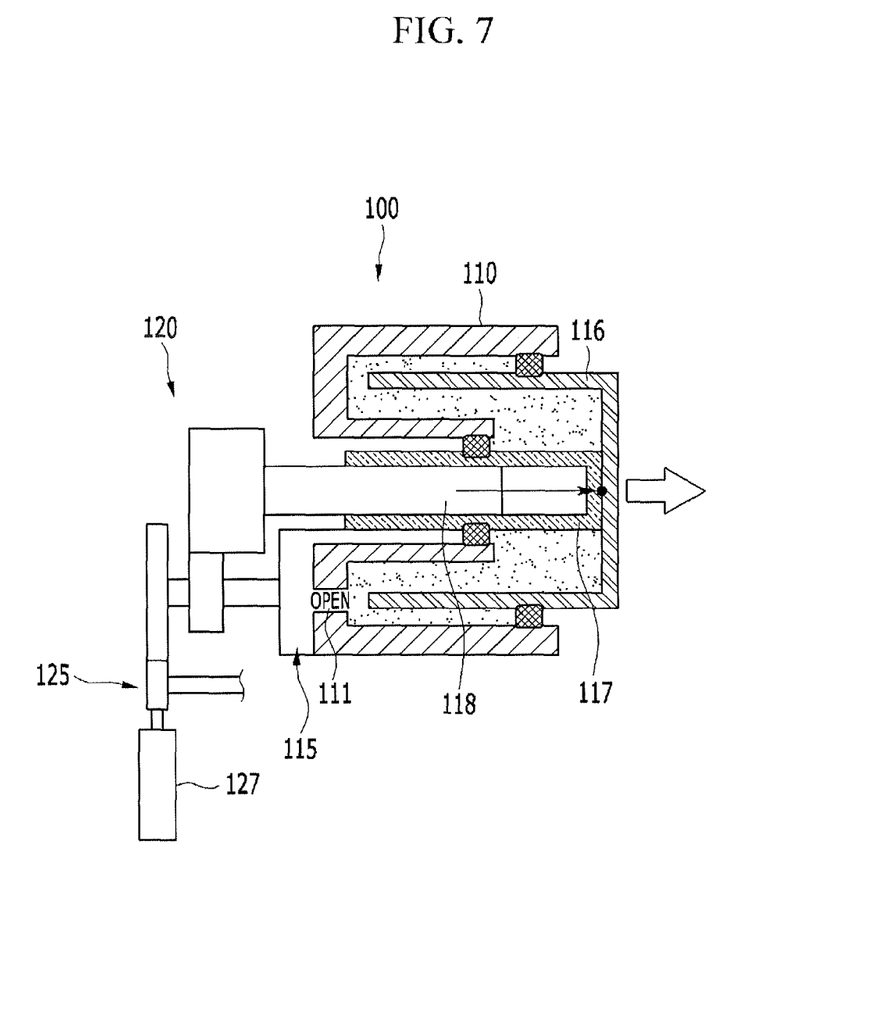
FIG. 7 is a cross-sectional view of the compound caliper device in a parking brake stage according to the present invention.
Figure 8:
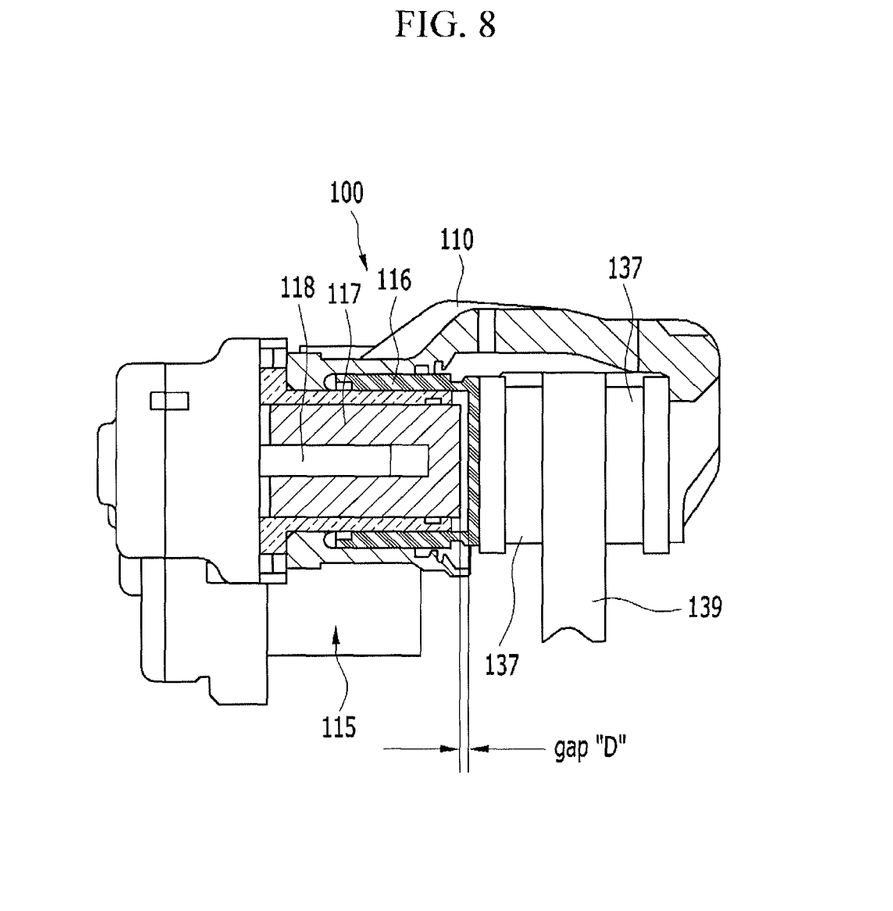
FIG. 8 is a cross-sectional view of the compound caliper device in a primary brake stage according to the present invention.
Figure 9A:
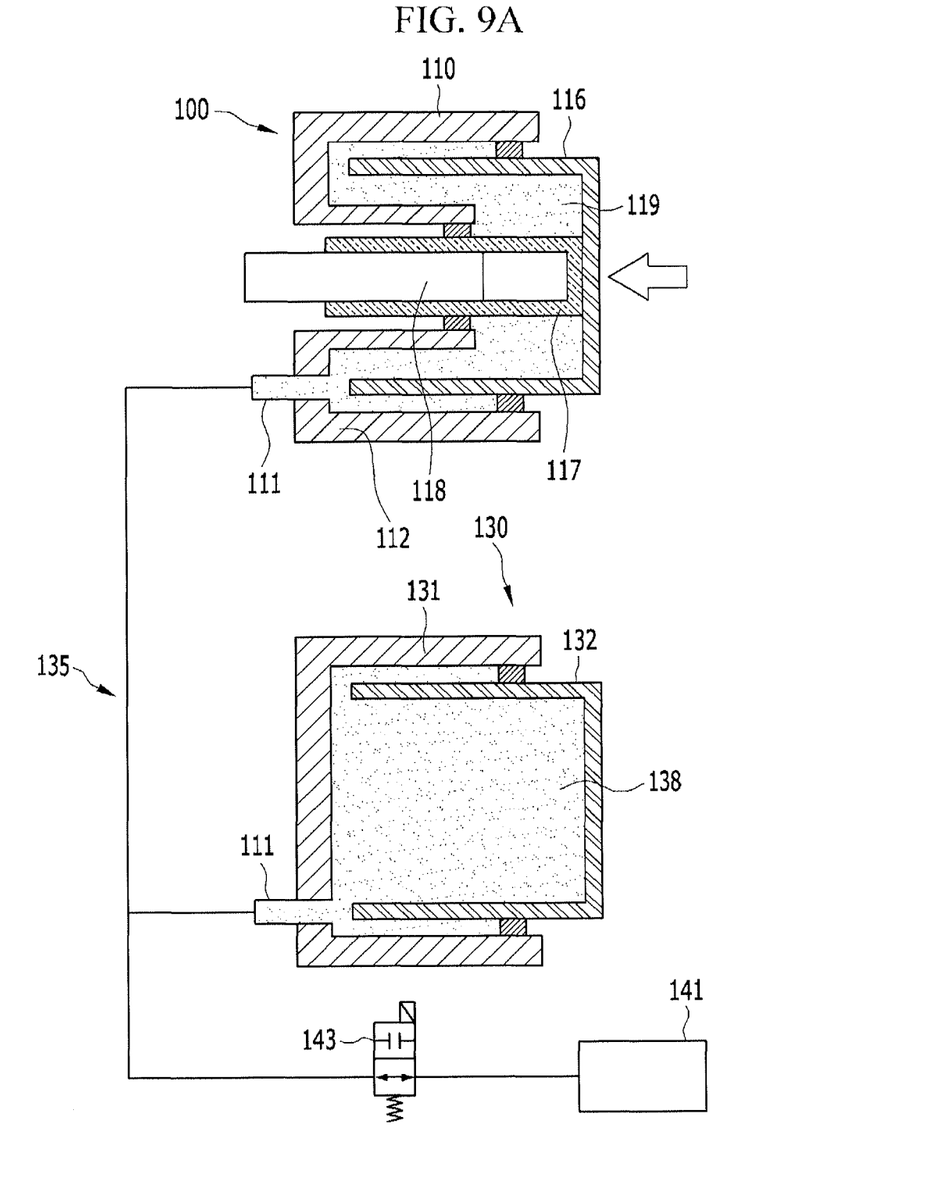
FIG. 9A is a cross-sectional view of the compound caliper device and a hydraulic caliper device in a parking brake stage according to the present invention.
Figure 9B:
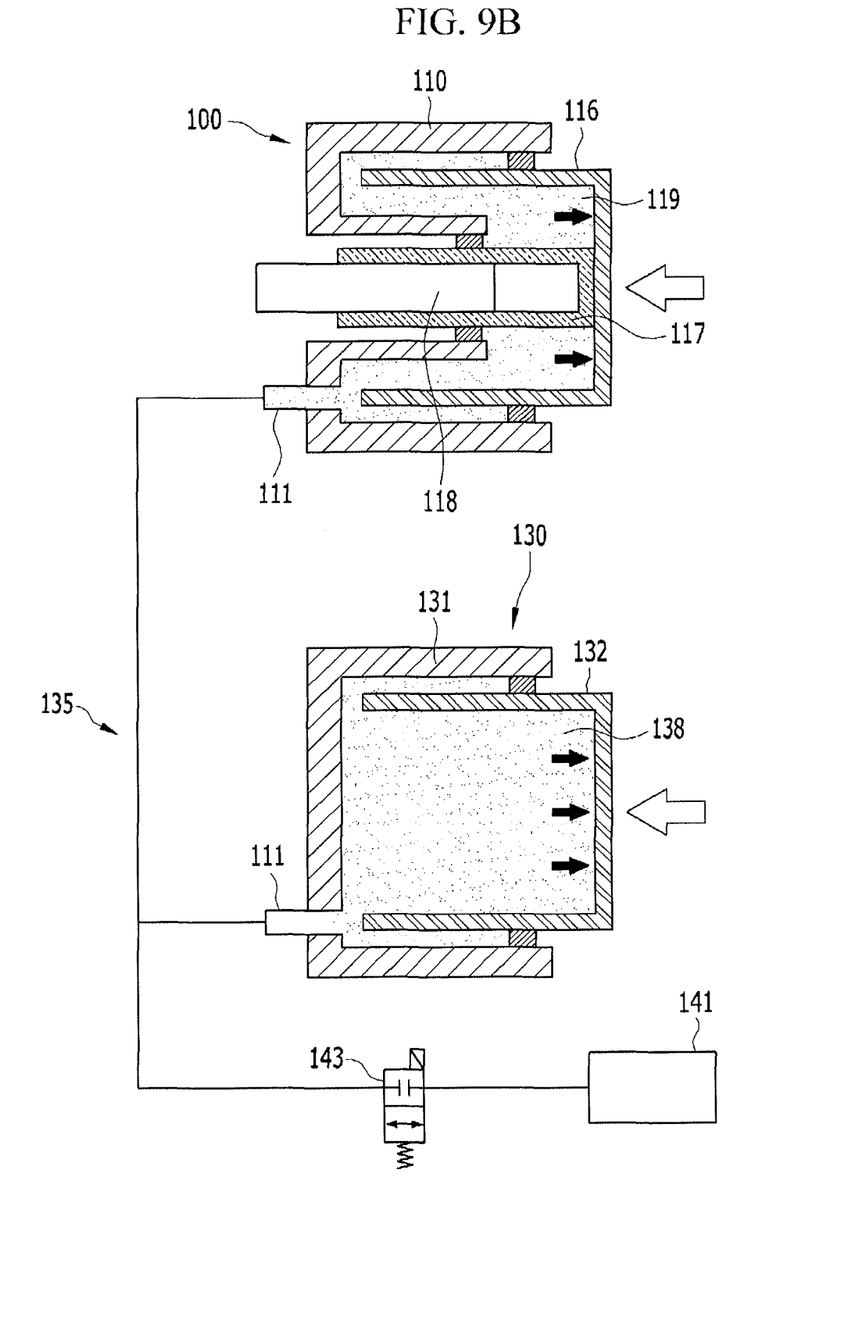
FIG. 9B is a cross-sectional view of the compound caliper device and the hydraulic caliper device in a state during which a parking brake stage is converted into a primary brake stage according to the present invention.
Figure 9C:
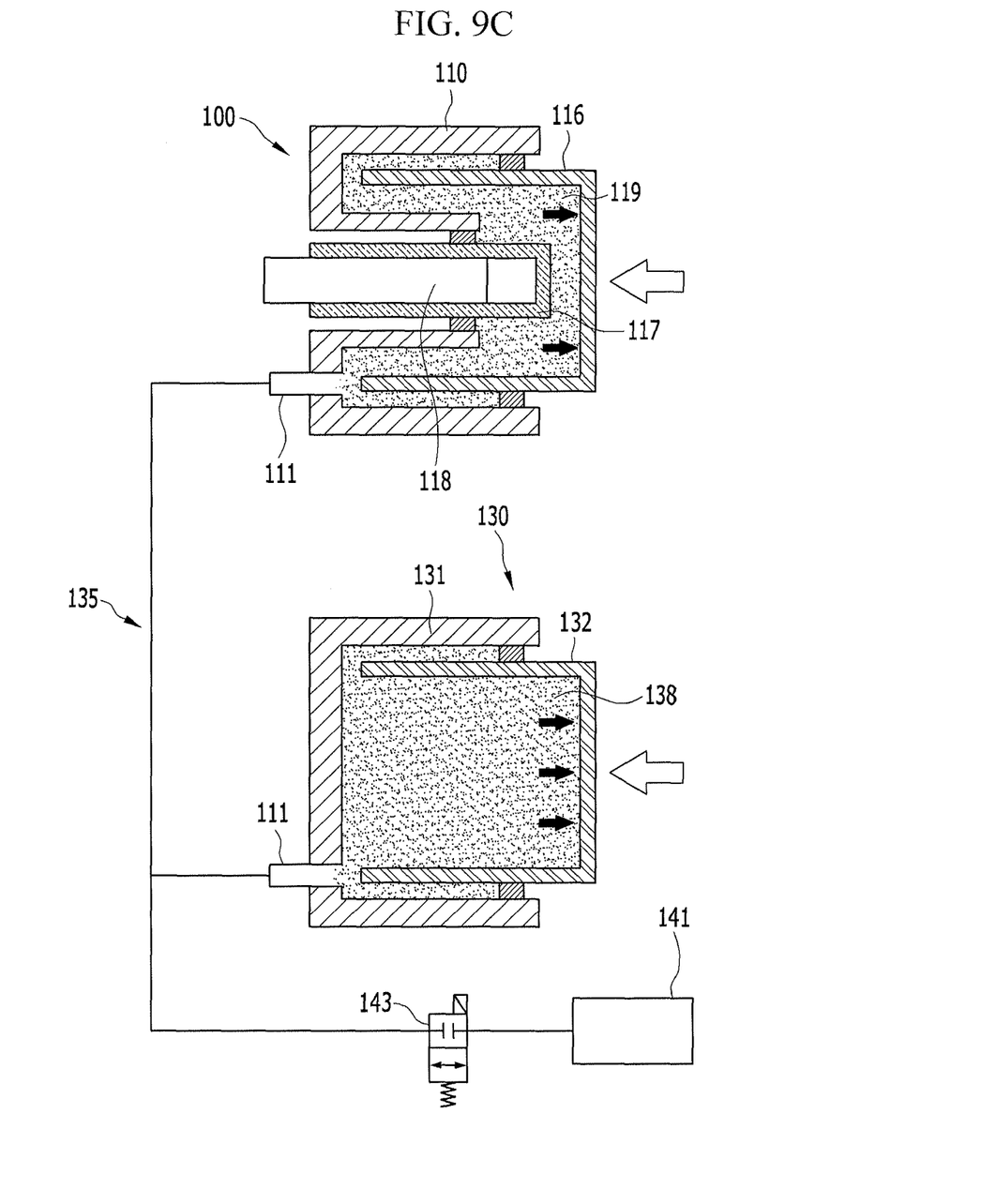
FIG. 9C is a cross-sectional view of the compound caliper device and the hydraulic caliper device in a primary brake stage according to the present invention.
Figure 10:
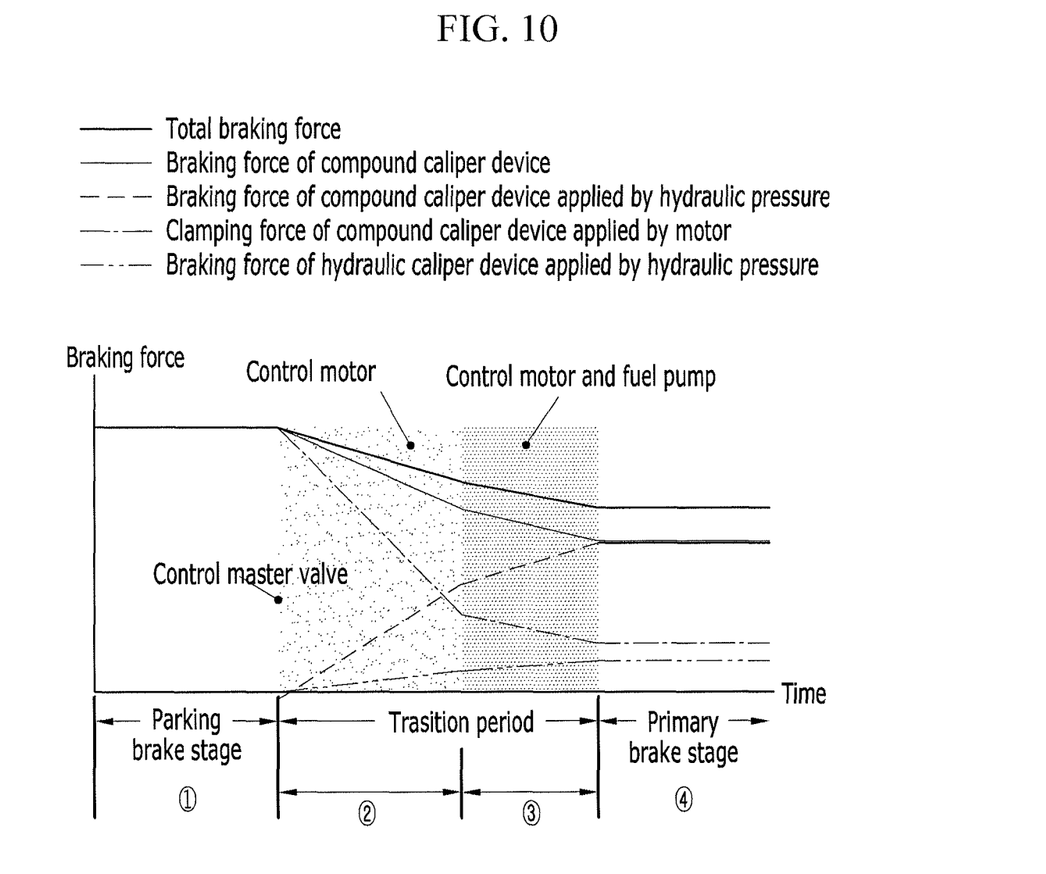
FIG. 10 is a graph illustrating a method for controlling an exemplary brake system according to the present invention.

FIG. 1 is a schematic diagram of a braking system in a parking brake stage according to various embodiments of the present invention, FIG. 2 is a schematic diagram of a braking system in a state in which a master valve is closed according to various embodiments of the present invention, FIG. 3 is a schematic diagram of a braking system in a state in which a hydraulic pump is operated according to various embodiments of the present invention, FIG. 4 is a schematic diagram of a braking system in a primary brake stage according to various embodiments of the present invention, FIG. 5 is a flowchart of a method for controlling a braking system according to various embodiments of the present invention, FIG. 6 is a cross-sectional view of a compound caliper device according to various embodiments of the present invention, FIG. 7 is a cross-sectional view of a compound caliper device in a parking brake stage according to various embodiments of the present invention, FIG. 8 is a cross-sectional view of a compound caliper device in a primary brake stage according to various embodiments of the present invention, FIG. 9A is a cross-sectional view of a compound caliper device and a hydraulic caliper device in a parking brake stage according to various embodiments of the present invention, FIG. 9B is a cross-sectional view of a compound caliper device and a hydraulic caliper device in a state during which a parking brake stage is converted into a primary brake stage according to various embodiments of the present invention, FIG. 9C is a cross-sectional view of a compound caliper device and a hydraulic caliper device in a primary brake stage according to various embodiments of the present invention, and FIG. 10 is a graph illustrating a method for controlling a brake system according to various embodiments of the present invention.

As shown in FIGS. 1 to 4, and 6, a braking system having an electromechanical braking function according to various embodiments of the present invention includes a compound caliper device 100, a hydraulic caliper device 130, and a hydraulic pressure producer 190 supplying hydraulic pressure to the compound caliper device 100 and the hydraulic caliper device 130.

The compound caliper device 100 may disposed at any one of a front wheel and rear wheel, and the hydraulic caliper device may be disposed the other on of the front wheel and the rear wheel.

The compound caliper device 100 is operated by the hydraulic pressure producer and a motor 115. The compound caliper device 100 presses a pair of brake pads 137 to a brake disk 139, and the brake pads 137 are contacted with the brake disk 139 to perform a braking function.

The compound caliper device 100 and the hydraulic caliper device 130 are connected to the hydraulic pressure producer supplying hydraulic pressure. The hydraulic pressure producer 190 may include a hydraulic line 135, a master valve 143, a first opening/closing valve 136a, a second opening/closing valve 136b, and a hydraulic pump 155.

Oil is stored in a reservoir 150, and the master cylinder 141 converts operation of a brake pedal 145 into hydraulic pressure. The hydraulic pressure generator 190 may supply the hydraulic pressure of the master cylinder 141 to the compound caliper device 100 and the hydraulic caliper device 130.

The hydraulic line 135 connects the master cylinder 141 to the compound caliper device 100 and the hydraulic caliper device 130. The hydraulic line 135 may include a master hydraulic line 140, a caliper hydraulic line 156, and a pump hydraulic line 160.

The master hydraulic line 140 receives oil from the master cylinder 141. A master valve 143 for opening and closing the master hydraulic line 140 is disposed on the master hydraulic line 140.

The caliper hydraulic line 156 is connected to the compound caliper device 100 and the hydraulic caliper device 130. A first opening/closing valve 136a and a second opening/closing valve 136b for opening/closing the caliper hydraulic line 156 are disposed on the caliper hydraulic line 156. The first opening/closing valve 136a may selectively block an oil flow to the compound caliper device 100, and the second opening/closing valve 136b may selectively block an oil flow to the hydraulic caliper device 130. Each of the first and second opening/closing valves 136a and 136b may be provided with a spool valve operated with a solenoid.

Oil discharged from the compound caliper device 100 and the hydraulic caliper device 130 is temporarily stored in an accumulator 165. A hydraulic pump 155 may pump the oil to increase hydraulic pressure supplied to the compound caliper device 100 and the hydraulic caliper device 130. A pump hydraulic line 160 connects the hydraulic pump 155 to the caliper hydraulic line 156. A pump valve 161 selectively blocking an oil flow may be disposed on the pump hydraulic line 160. A check valve 170 for preventing a counter flow is disposed between the hydraulic pump 155 and the accumulator 165. A relief valve 145 returns oil back to the master cylinder 55 when hydraulic pressure discharged from the hydraulic pump 155 increases more than required.

The outlet valve 134 may be opened by hydraulic pressure occurring while a primary brake stage is converted into a parking brake stage such that oil may be stored in the accumulator 165.

The braking system according to an exemplary embodiment of the present exemplary embodiment may be operated by a brake controller 180. The brake controller 180 may be implemented with one or more processors executed by a predetermined program. The predetermined program may include a series of commands for performing each step included in a method for controlling the braking system according to an exemplary embodiment of the present invention.

Referring to FIGS. 6 to 8, the compound caliper device 100 may include a housing body 110 having an inflow/outflow passage 111 connected to the hydraulic pressure producer 190, a motor 115 generating rotational force, an external piston 116 disposed in the housing body 110 to be reciprocated by the motor 115 or the hydraulic pressure produce 190, an internal piston 117 disposed to be reciprocated with respect to the external piston, and a spindle 118 coupled to the internal piston 117 and operated by the motor 115. Oil exists in a first hydraulic chamber 119 between the external piston 116 and the internal piston 117.

The spindle 118 in which screw threads are formed may be screw-coupled to the internal piston 117. The internal piston 117 may be contacted with the external piston 16 or may be separated from the external piston 16 by a rotation of the spindle 118 by the motor 115.

A plurality of gears 120 for boosting rotational force of the motor 115 may be disposed between the spindle 118 and the motor 115.

The brake controller 180 presses the brake pads 137 to the brake disk 139 through the motor 115, and opens the first and second opening/closing valves 136a and 136b and the master valve 143 to release hydraulic pressure, such that the parking braking of the compound caliper device 100 may be performed. In detail, the brake controller 180 may rotate the spindle 118 through the motor 115 to allow the internal piston 117 to contact the external piston 116. Accordingly, the external piston contacted with the internal piston 117 presses the brake pads 137 such that the parking braking is performed. In other words, the parking braking may be performed by clamping force of the brake pads 137 applied by the motor 115 without providing hydraulic pressure of the hydraulic pressure producer 190. In this case, a position of the motor 115 may be locked and fixed by a locker 125 operated by a solenoid 127.

After closing the master valve 143, the brake controller 180 may decrease the clamping force of the brake pads 137 applied by the motor 115 and may increase hydraulic pressure due to the hydraulic pressure producer 190, such that the parking brake stage may be converted into the primary brake stage. In detail, the brake controller 180 may close the master valve 143 so as to make the first hydraulic chamber 119 to be in a state in which hydraulic pressure is capable of being generated. After that, the brake controller 180 decreases the clamping force of the brake pads 137 applied by the motor 115 by rotating the spindle 118 until the internal piston is separated from the external piston 116. In this case, hydraulic pressure may generated in the first hydraulic chamber 119 by reaction force of the brake pads 137 which has been compressed. When the internal piston 117 is separated from the external piston 116 by the rotation of the spindle 118, the brake controller controls the hydraulic pressure producer 190 to generate hydraulic pressure considering the decreased clamping force of the brake pads 137 applied by the motor 115 and total braking force in the primary brake stage. In other words, the brake controller 180 may compensate for the decreased clamping force of the brake pads 137 applied by the motor 115 by using the hydraulic pump 155. In order to perform the primary braking, the internal piston 117 needs to be separated by a predetermined gap D from the external piston 116. Accordingly, the brake controller 180 may decrease the clamping force of the brake pads applied by the motor 115 and may increase hydraulic pressure supplied from the hydraulic pump 155 to the compound caliper device 100 and the hydraulic caliper device 130 until the internal piston 117 is separated by the predetermined distance D from the external piston 116 (i.e., until the position of the motor 115 is initialized.

Since the internal piston 117 is separated by the predetermined gap D from the external piston 116, demand braking force of a driver based on a manipulation of a brake pedal 145 may be satisfied by controlling the motor 115. In other words, hydraulic pressure in the first hydraulic chamber 119 of the compound caliper device 100 and a second hydraulic chamber 138 of the hydraulic caliper device 130 may be increased or decreased by controlling the motor 115.

The hydraulic caliper device 130 is operated by the hydraulic pressure producer 190. The hydraulic caliper device 130 may include a housing body 131 having an inflow/outflow passage 133 connected to the hydraulic pressure producer 190, and a hydraulic piston 132 disposed in the housing body 131 to be reciprocated with respect to brake pads. Since the detailed configuration of the hydraulic caliper device 130 is equivalent to that used for a conventional braking system, the detailed description thereof is omitted.

Hereinafter, a method for controlling a braking system according to various embodiments of the present invention will be described with reference to FIGS. 5 and 10.

The brake controller 180 determines whether a conversion condition for converting the parking brake stage into the primary brake stage is satisfied at step S100. For example, the conversion condition may be satisfied when a parking button is operated by a driver. As shown in FIG. 1 and FIG. 9A, in the parking brake stage, the internal piston 117 is contacted with the external piston 116 by the motor 115 without providing hydraulic pressure of the hydraulic pressure producer 190. Total braking force in the parking brake stage corresponds to clamping force of the brake pads 137 applied by the motor 115.

When the conversion condition is satisfied at step S100, as shown in FIG. 2 and FIG. 9B, the brake controller 180 closes the master valve 143 and then decreases the clamping force of the brake pads 137 applied by the motor 115 at step 5110.

While decreasing the clamping force of the brake pads 137 applied by the motor 115, the brake controller 180 determines whether the internal piston 117 is separated from the external piston 116 at step S120. When the clamping force is decreased in a state in which the master valve 143 is closed and the internal pistor 117 is contacted with the external piston 116, hydraulic pressure may be generated in the first hydraulic chamber 119 by reaction force of the brake pads 137 which has been compressed. The hydraulic pressure is increased until immediately before the internal piston 117 is separated from the external piston 116. The brake controller 180 may determine that the internal piston 117 is separated from the external piston 116 when the hydraulic pressure is decreased.

When the internal piston 117 is separated from the external piston 116 at step S120, as shown in FIG. 3 and FIG. 9C, the brake controller 100 continuously decreases the clamping force of the brake pads 137 applied by the motor 115, and then may control the hydraulic pump to generate hydraulic pressure considering the decreased clamping force of the brake pads applied by the motor 115 and total braking force in the primary brake stage at step S140.

The brake controller 180 decreases the clamping force of the brake pads 137 applied by the motor 115 until the internal piston 117 is separated by the predetermined gap D from the external piston 116 (i.e., until the position of the motor 115 is initialized) (S150: Yes), and increases hydraulic pressure supplied from the hydraulic pump 155 to the compound caliper device 100 and the hydraulic caliper device 130. For example, when the hydraulic pressure supplied from the hydraulic pump 155 to the compound caliper device 100 and the hydraulic caliper device 130 is not further increased (i.e., total oil stored in the accumulator 165 is supplied to the compound caliper device 100 and the hydraulic caliper device 130) as shown in FIG. 4, the brake controller 180 may determine that the initialization of the position of the motor 115 is completed.

After that, in the primary brake stage, as the internal piston 117 is separated by the predetermined gap D from the external piston 116, the brake controller may control the motor 115 to satisfy demand braking force of a driver.

According to various embodiments of the present invention, when the parking brake stage is converted into the primary brake stage, the number of operations of the valves of the hydraulic pressure producer 190 may be minimized, thereby improving durability of the hydraulic pressure producer 190.

In addition, the transition period during which the parking brake stage is converted into the primary brake stage may be decreased by preventing overshoot of total braking force.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A braking system having an electromechanical braking function, the braking system comprising:
    a compound caliper device including a motor and configured to press a pair of brake pads against a brake disk;
    a hydraulic pressure producer including a master hydraulic line receiving oil from a master cylinder, a master valve configured to open and close the master hydraulic line, a caliper hydraulic line connected to the compound caliper device, and a hydraulic pump configured to increase hydraulic pressure supplied to the compound caliper device; and
    a brake controller to control the motor and the hydraulic pressure producer,
    wherein the brake controller is configured to close the master valve and decrease clamping force of the brake pads applied by the motor when a conversion condition for converting a parking brake stage into a primary brake stage is satisfied, wherein the compound caliper device further comprises:
- a housing body having an inflow/outflow passage connected to the hydraulic pressure producer;
- an external piston disposed in the housing body to be reciprocated by the motor or the hydraulic pressure producer;
- an internal piston disposed to be reciprocated with respect to the external piston; and
- a spindle coupled to the internal piston and operated by the motor, and wherein the braking controller is configured to determine whether the internal piston is separated from the external piston while decreasing the clamping force of the brake pads applied by the motor, and wherein, when the internal piston is separated from the external piston, the controller is configured to control the hydraulic pump to generate hydraulic pressure considering the decreased clamping force of the brake pads applied by the motor and total braking force in the primary brake stage.

2. The braking system of claim 1, wherein when the internal piston is separated from the external piston, the brake controller is configured to decrease the clamping force of the brake pads applied by the motor and configured to increase hydraulic pressure supplied from the hydraulic pump to the compound caliper device until the internal piston is separated by a predetermined gap from the external piston.

3. The braking system of claim 1, wherein in the parking brake stage, the internal piston is configured to contact the external piston by the motor without providing hydraulic pressure of the hydraulic pressure producer.

4. The braking system of claim 1, wherein the hydraulic pressure producer further includes:
- a pump hydraulic line connecting the hydraulic pump to the caliper hydraulic line; and
- an accumulator in which oil discharged from the compound caliper device is stored.

5. The braking system of claim 1, further comprising a hydraulic caliper device operated by the hydraulic pressure producer,
wherein the compound caliper device is disposed at at least one of a front wheel and a rear wheel, and the hydraulic caliper device is disposed a remaining one of the front wheel and the rear wheel.

6. The braking system of claim 5, wherein in the primary brake stage, the brake controller is configured to control the motor to increase or decrease hydraulic pressure in a first hydraulic chamber of the compound caliper device and a second hydraulic chamber of the hydraulic caliper device.

7. The braking system of claim 1, wherein a plurality of gears for boosting rotational force of the motor are disposed between the spindle and the motor.

8. A method for controlling a braking system, the method comprising:

Closing, by a braking controller, a master valve and decreasing clamping force of brake pads applied by a motor when a conversion condition for converting a parking brake stage into a primary brake stage is satisfied; and controlling, by the braking controller, a hydraulic pump to generate hydraulic pressure considering the decreased clamping force of the brake pads applied by the motor and total braking force in the primary brake stage when an internal piston is separated from an external piston, wherein the braking system includes:
a compound caliper device including a motor, an external piston, an internal piston, and a spindle, and pressing a pair of the brake pads to a brake disk, and a hydraulic pressure producer including a master hydraulic line that receives oil from a master cylinder, the master valve that opens and closes the master hydraulic line, a caliper hydraulic line connected to the compound caliper device, and the hydraulic pump that increases hydraulic pressure supplied to the compound caliper device, wherein the compound caliper device further comprises:
- a housing body having an inflow/outflow passage connected to the hydraulic pressure producer;
- the external piston disposed in the housing body to be reciprocated by the motor or the hydraulic pressure producer;
- the internal piston disposed to be reciprocated with respect to the external piston; and
- a spindle coupled to the internal piston and operated by the motor, and wherein the braking controller is configured to determine whether the internal piston is separated from the external piston while decreasing the clamping force of the brake pads applied by the motor, and wherein, when the internal piston is separated from the external piston, the controller is configured to control the hydraulic pump to generate hydraulic pressure considering the decreased clamping force of the brake pads applied by the motor and the total braking force in the primary brake stage.

9. The method of claim 8, further comprising decreasing the clamping force of the brake pads applied by the motor and increasing hydraulic pressure supplied from the hydraulic pump to the compound caliper device until the internal piston is separated by a predetermined gap from the external piston.

* * * * *